United States Patent Office 3,349,223
Patented Oct. 24, 1967

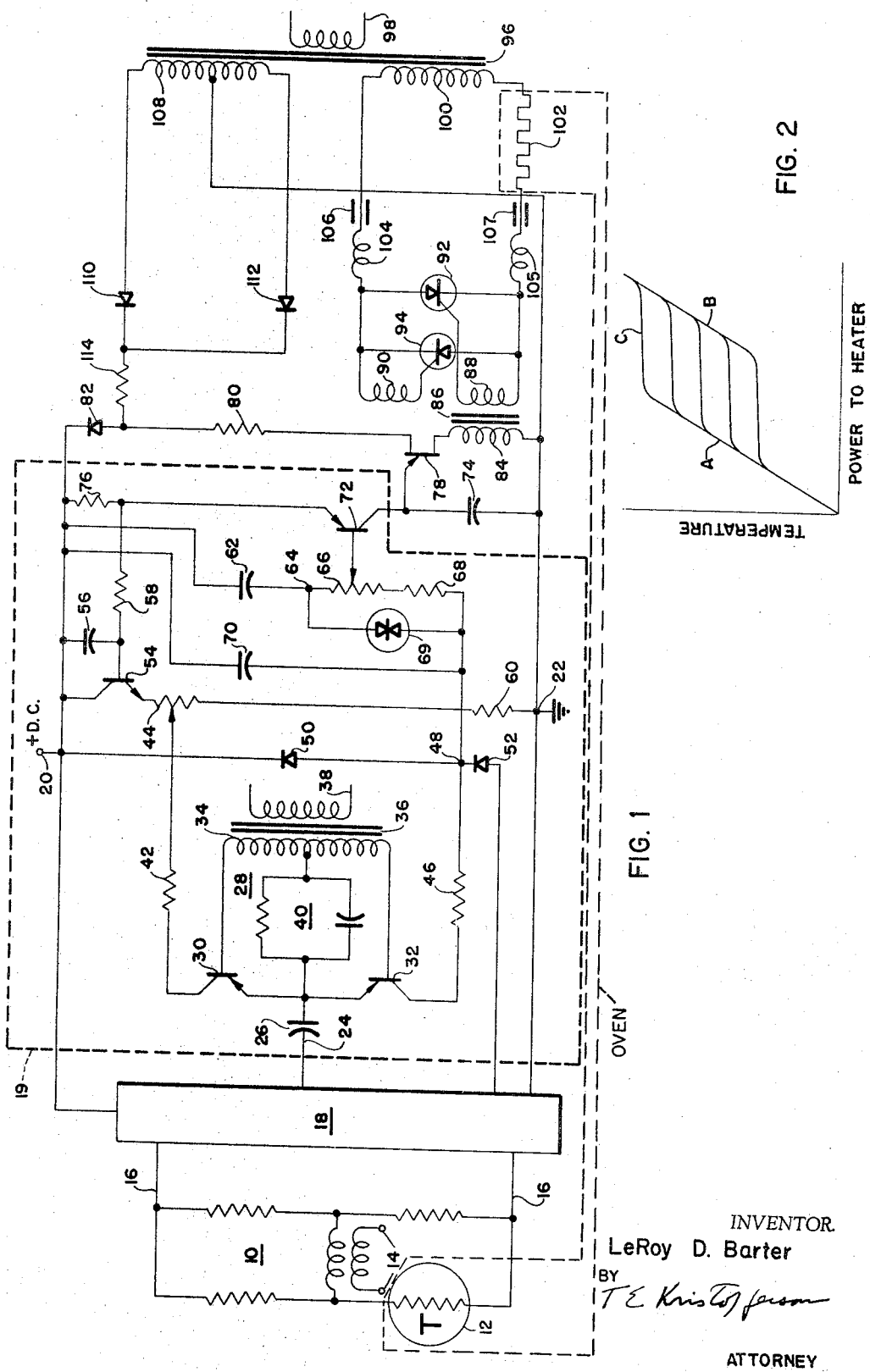

3,349,223
OVEN TEMPERATURE CONTROL STABILIZING
NETWORK
Le Roy D. Barter, Fullerton, Calif., assignor to Beckman
Instruments, Inc., a corporation of California
Filed Oct. 9, 1964, Ser. No. 402,759
12 Claims. (Cl. 219—413)

ABSTRACT OF THE DISCLOSURE

The disclosure illustrates a controller having an A.C. amplifier to sense a condition error from a sensor in a bridge circuit and apply the error signal through a demodulator circuit to a stabilizing network. In the stabilizing network a capacitor is charged through a resistive network paralleled with a double-ended Zener diode. The error signal from across the resistive network and an isothermal signal from the capacitor are connected to the storage device of an oscillator. The oscillator output is coupled to the control windings of a full-wave silicon controlled rectifier network to deliver power to the load.

This invention relates to a stabilizing network for an oven temperature control system and more particularly to such a newtork which will allow for both rapid correction when large changes in magnitude are desired and smaller corrections with corresponding finer control when near an adjustable desired temperature.

In attempting to provide a flexible control for oven temperature which will operate rapidly when wide temperature swings are desired and with improved accuracy when controlling around the desired temperature, the prior art has supplied devices such as amplifiers employing two levels of amplification in the two different regions of operation. Such devices result in what is effectively a limiter having fixed limits.

Another prior art technique has been to change the signal to the input of the amplifier by passing high rate signals through frequency sensitive circuits. Again the limits of operation of such a circuit are fixed. Accordingly, it is an object of this invention to provide a circuit for stabilizing oven temperature control, or the like, capable of operating in two modes depending upon the temperature difference from a set point.

Another object of the invention is to deliver a continuous amount of power to the oven heater even when the thermometer bridge is at balance.

A further object of the invention is to provide such a circuit capable of producing a control signal comprising a combination of signals representing the average power necessary in the heater for isothermal conditions and a signal representative of relatively fast temperature errors.

A still further object of the invention is to provide such a control circuit in which adjustments are continually made for changes in static conditions such that smaller and faster variations can be controlled at optimum conditions for the associated amplifier and thermometer while not detracting from the ability to change the static conditions quickly when required.

In carrying out the invention in one form thereof, a controller is provided in which an A.C. amplifier senses a condition error from a sensor in a bridge circuit and applies an error signal through a demodulator circuit to a stabilizing network. A capacitor is charged through a resistive network paralleled with a double-ended zener diode such that if the voltage level of the error exceeds a given amount the diode will short out the resistor through which the capacitor is otherwise charged permitting more rapid charging. The error signal as represented by the voltage across the resistor and the isothermal signal as represented by the voltage on the capacitor is then fed to an output device through an output amplifier.

In a more specific embodiment, a second capacitor of much smaller capacity parallels the series combination of the first capacitor and resistive network and the output device is a storage device of an oscillator circuit. The output of the oscillator circuit is coupled to the control windings of a full wave controlled rectifier network which will deliver power to the load. The first output pulse from the oscillator each half cycle of the controlled rectifiers serves to trigger one of the silicon controlled rectifiers which will then remain on until the A.C. power applied across it changes in polarity. Thus, the first pulse of the oscillator in any half cycle of the silicon controlled rectifier circuit provides the control desired.

The novel features which are believed to be characteristic of the invention are set forth with particularity in the appended claims. The invention itself, however, together with further objects and advantages thereof can best be understood by reference to the following description taken in connection with the accompanying drawings in which:

FIG. 1 is a diagram, partly in block and partly in circuit form, of one embodiment of a controller incorporating the invention; and FIG. 2 is a graph of temperature vs. heater power illustrating the ability of the circuit of FIG. 1 to automatically switch the limits of fine control.

Referring to the drawings, in FIG. 1, there is illustrated one embodiment of the invention employing a thermometer bridge 10 in which a sensor such as a resistance thermometer or thermistor 12 senses a quantity to be controlled such as an oven temperature variation. The bridge 10 may be adjusted as is well-known in the art. A 60 cycle potential is applied across the bridge 10 at the terminals 14. The output of the bridge 10 is applied over leads 16 to the input of an A.C. amplifier 18.

Amplifier 18 is connected to a modulator 19, enclosed in the dashed lines, which contains the control circuit which is the subject of this invention. One side of amplifier 18 is connected to terminal 20 which is at a level of D.C. potential which in one embodiment may be 22.5 volts. Another terminal of amplifier 18 is connected to a point of reference potential 22, for example, ground. An output lead 24 of amplifier 18 is connected through a capacitor 26 to a demodulator 28 consisting of two PNP transistors 30 and 32, having their emitters connected together and their bases connected to opposite extremities of a secondary winding 34. Capacitor 26 is connected between lead 24 and the emitters of transistors 30 and 32.

Secondary winding 34 is on a transformer 36 having a primary winding 38 across which a source of 60 cycles is applied, synchronized with the source supplied to terminals 14. A network 40 consisting of a resistor and capacitor in parallel is connected from the emitters of transistors 30 and 32 to a center tap of winding 34. The collector of transistor 30 is connected through a resistor 42 to the movable contact on a potentiometer 44. The collector of transistor 32 is connected through a resistor 46 to a terminal 48. A clipping diode 50 is connected between terminals 20 and 48 and a second clipping diode 52 is connected from terminal 48 to a point of reference potential, above ground, in amplifier 18.

A decoupling network constituting an PNP transistor 54 having a capacitor 56 connected across its base and collector and a resistor 58 having one side connected to its base electrode is provided. The collector of transistor 54 is connected to terminal 20 and the emitter of transistor 54 is connected to one extremity of potentiometer 44. The other extremity of potentiometer 44 is connected through a resistor 60 to ground terminal 22.

A capacitor 62, having a large time constant, is connected between terminal 20 and a terminal 64. The extremities of a potentiometer 66 are connected in series with a resistor 68 between terminals 64 and 48. A double-ended zener diode 69 is connected between terminals 64 and 48 in parallel with potentiometer 66 and resistor 68.

A second capacitor 70, which is normally much smaller in value than capacitor 62, and need be only large enough to maintain its voltage when the synchronous demodulating switch 28 is connected through transistor 30, is also connected between terminals 20 and 48. The wiper of potentiometer 66 is connected to the base of a PNP transistor 72 which acts as a current source for charging a storage device such as capacitor 74 connected between its collector and terminal 22. The emitter of transistor 72 is connected to the side of resistor 58 away from the base of transistor 54 and through a resistor 76 to terminal 20. The collector of transistor 72 is also connected to the emitter electrode of a unijunction transistor 78.

One base of unijunction transistor 78 is connected through a resistor 80 and a diode 82 in series, respectively, to terminal 20. The other base of unijunction transistor 78 is connected through a primary winding 84 of a pulse transformer 86 to terminal 22. Two secondary windings 88 and 90 on transformer 86 are connected across the cathode and gate electrodes of silicon controlled rectifiers 92 and 94 respectively.

Power is supplied to the silicon controlled rectifiers 92 and 94 through a transformer 96 having a primary winding 98 to which a source of 60 cycle potential synchronized with that applied to winding 38 and terminals 14 is applied. A secondary winding 100 on transformer 96 is coupled in series with a load 102, which may be an oven heater resistance, and filter chokes 104 and 105 through feed through capacitors 106 and 107 across the cathodes and anodes of silicon controlled rectifiers 92 and 94.

A full wave synchronizing circuit is applied to unijunction transistor 78 by means of a full-wave rectifier circuit comprising a second secondary winding 108 on transformer 96 having its extremities connected through diodes 110 and 112 and then through a resistor 114 to the side of diode 82 away from terminal 20. The center tap of secondary 108 is connected to common terminal 22.

The operation of the circuit of FIG. 1 is as follows. The resistance thermometer or thermistor 12 is connected in the bridge circuit 10 whose elements can be adjusted for the desired resistance to set for the desired temperature. If the temperature sensed by the thermometer 12 is different than the set value, the bridge will be unbalanced and an error signal proportional to the temperature difference will appear at the input of A.C. amplifier 18. The output of amplifier 18 is applied to modulator 19. The output of modulator 19 is a current which is a function of the temperature difference. This current controls the firing of unijunction transistor 78. The output pulse from unijunction transistor 78 in turn fires the silicon controlled rectifiers 92 and 94 which act as switches controlling power to the load 102. The amount of heat produced is controlled by varying the phase of the turning on of power to the load. The silicon controlled rectifiers 92 and 94, as previously mentioned, automatically turn off every half cycle.

Capacitor 62 has a large time consant associated with it. The product of its capacity and the resistance across it, arising from its leakage and the current required by transistor 72, is large compared to the thermal time constants in the oven, not illustrated, which are in the control path. Hence, the voltage across capacitor 62 represents the average power necessary in the heater for isothermal conditions. For large temperature errors, coming for instance from a change in the desired temperature or at turn on, the signal out of amplifier 18 will be large enough so that the double-ended zener diode 69 will conduct. Consequently, for large temperature errors, amplifier 18 can quickly change the voltage on capacitor 62 to that for the desired temperature, be it greater or less.

Capacitor 70, which is normally much less in value than capacitor 62, is sensitive to small and relatively fast temperature errors occurring as a change in voltage across it. Potentiometer 66 may be varied to select the desired ratio of the signals and time constants to provide the dynamic response desired for the control system.

The demodulator contact through transistor 30 is returned to a voltage derived from the potential across capacitor 62, so that at temperature balance, the peak to peak voltage from the A.C. amplifier 18 will also be zero. Because the demodulating current can be large, a decoupling network consisting of transistor 54, capacitor 56 and resistor 58 is used between the emitter of transistor 72, which is at essentially the potential of capacitor 62, and the demodulator return contact through transistor 30.

Transistor 72 acts as a current source for charging capacitor 74 because of its high collector resistance. The magnitude of the current will be very nearly equal to the voltage between the base of transistor 72 and the plus supply connected to terminal 20, divided by the resistance of resistor 76.

Consequently, the current and conduction time of the silicon controlled rectifiers 92 and 94 will have a D.C. value proportional to the average power needed by the load and small deviations, both plus and minus, equivalent to changes required, such as from changes in line voltage or oven heat loads. When large changes are needed, as when the set point of temperature is suddenly changed, the zener diode 69 assumes a state of high conductivity and the controller can quickly adjust the power delivered to the load to the new value required.

Returning to the demodulator 28, the A.C. signal from amplifier 18 is demodulated by it and its output appears as a D.C. voltage difference between the storage capacitors 62 and 70 and potentiometer 66 and resistor 68. This is a boot-strap arrangement so that any power level in the load 102 can be maintained with zero output from amplifier 18, limited by the leakage time constant of the storage capacitor 62. Capacitor 70, which may be 1 microfarad, supplies an initial filtering. Transistor 72, which may be a silicon PNP transistor, provides a charging current for the capacitor 74 which is proportional to the integral of the output of amplifier 18 which appears on capacitor 62 plus an adjustable component proportional to the amplifier output which appears on capacitor 70. The voltage between these is adjustable via the potentiometer 66 which may be a 50,000 ohm potentiometer, thus providing a rate signal. The double-ended zener diode 69 limits the dynamic range of this quasi-linear operation such that if the temperature error gets large the system can correct at a rate determined by the A.C. amplifier ouput impedance of amplifier 18, instead of the linear network resistance which may be 250,000 ohms, comprising potentiometer 66 and resistor 68 in series.

The clipping voltage set by the diode 69 may be chosen as a compromise between maximum amplifier output swing and the time delay experienced in the oven. Its effect is to change the oven temperature at a comparatively fast rate until the thermometer or thermistor 12 registers a change in the sign of the error. The output of modulator 19 can then reverse quickly by an amount set by the rate potentiometer 66. The lag in voltage across the storage capacitor 62 then should match the lag in temperature existing in the thermometer 12 in which case the voltage on the storage capacitor 62 is just equal to that required to provide the isothermal power to the heater 102 to maintain the set temperature. Consequently, the full dynamic range can then be used as a vernier control instetad of being based at zero power.

The voltage equivalent of the temperature error may be approximated as follows. For a first approximation the oven will have a constant thermal resistance. Temperature will thus be proportional to power. Power in turn is a function of the voltage across capacitor 62. Temperature, therefore, can be related to voltage across capacitor 62 and in a similar manner time rate of change of temperature can be related to voltage across the diode 69. Thus, to reach this equilibrium condition without overshoot the capacitor 62 and diode 69 may be selected as follows. The slewing error of thermometer 12 is a function of the time rate of change of heater power, which in turn is a function of the magnitude of capacitor 62. If the breakdown voltage of diode 69 and the magnitude of capacitor 62 are selected such that the voltage equivalent of the temperature slewing error equals the breakdown voltage of the diode 69 the system will stabilize at the set point without overshoot.

As mentioned previously, the transistor 72 converts the voltage across the storage capacitors 62 and 70 to a charging current for the unijunction timing capacitor 74. Capacitor 74 charges from zero to a voltage determined by the breakdown characteristics of unijunction transistor 78. Consequently, the collector of transistor 72 must always be able to go more positive than this even at high current levels. Therefore, the maximum voltage across the storage capacitors 62 and 70 is limited by the diode clippers comprising diodes 50 and 52 which also limit the reverse potential so that during error signals calling for reduced power storage capacitors 62 and 70 cannot get into a region equivalent to negative power.

Since the firing potential, and consequently the firing time, of unijunction transistor 78 depends upon the base voltage, the voltage on capacitor 74 can always be made to start at zero phase by causing the base voltage to be zero at this time interval. This is done by supplying unfiltered rectified 60 cycle potential to the unijunction bases. The rectified wave is clipped at the supply voltage by diode 82 to give a regulated reference potential for the timing circuit.

Timing capacitor 74 discharges through the pulse transformer 86 to supply the trigger signals for the silicon controlled rectifiers 92 and 94. The charge and discharge of timing capacitor 74 may continue throughout the cycle, but only the first discharge is of importance because it is enough to fire the associated silicon controlled rectifier which has a positive potential on its anode and which will not turn off until the end of the half cycle. An RF filter in the form of inductors 104, 105 and feed through capacitors 106 and 107 is provided to minimize the radiation of the high rate of change of potential.

Several factors make the system nonlinear. The gain is a function of line voltage because of the bridge supply and voltage across the load. The change in firing phase of the silicon controlled rectifiers 92 and 94 changes the small signal gain, that is the ratio of power change in the load to temperature error signal in the bridge. The conversion of voltage to current in the modulator 19 is an inverse function. Also the load 102 changes due to the ambient change in the oven and the oven's thermal capacity. The maximum rate of heating may also be different from the maximum rate of cooling.

The graph of FIG. 2 illustrates the dynamic characteristics of the circuit of FIG. 1. When outside the range of the clipping diode 10, the power to the heater will vary along either of the lines A or B with relative insensitivity. When within the clipping range, variations will occur along the lines C with a higher degree of sensitivity. Any one of the operating characteristics along the lines C, which are infinite in number, may be arrived at and operated along automatically. When a shift is indicated by a large temperature error, clipping diode 70 will cause the circuit to operate along either line A or B, depending upon the direction, and stabilize out at a new level, operating then along another one of the lines C.

It will be obvious to those skilled in the art that various modifications of the circuitry employed to implement the embodiment illustrated in FIG. 1 may be made. While a particular embodiment has been discussed, it will be understood that the invention is not limited thereto and that it is contemplated to cover any such modifications as fall within the true spirit and scope of the invention by the appended claims. For example, the controller is not limited to ovens. For instance, the silicon controlled rectifiers 92 and 94 could control a lamp with an input from a photo sensing device. It could also control a motor in which case the input could be speed, or the output of transistor 72 could be applied to a D.C. circuit controlling some load.

What is claimed as new and desired to be secured by Letters Patent of the United States is:

1. A controller comprising:
    a sensor for detecting an error from a set point;
    a stabilizing network including a storage device in series combination with a parallel combination of a resistor and a voltage breakdown device;
    means connecting the output of said sensor across said series combination to derive an output signal comprising a combination in a selectable ratio of an error signal represented by the voltage across said resistor and a set point signal represented by the voltage across said storage device; and
    means for feeding said output signal to an output device.

2. A controller comprising:
    a sensor for detecting an error from a set point;
    a stabilizing network including a storage capacitor in series combination with a parallel combination of a resistor and a double-ended zener diode;
    means connecting the output of said sensor across said series combination to derive an output signal comprising a combination in a selectable ratio of an error signal represented by the voltage across said resistor and a set point signal represented by the voltage across said capacitor; and
    an amplifier for coupling said output signal to an output device.

3. A controller comprising:
    a sensor for detecting an error from a set point;
    an A.C. amplifier;
    a stabilizing network including a demodulator, a first storage capacitor in series combination with a parallel combination of a resistor and a double-ended zener diode, and an output amplifier;
    means connecting the output of said sensor through said A.C. amplifier to the input of said demodulator;
    means connecting the output of said demodulator across said series combination to derive an output signal comprising a combination in a selectable ratio of an error signal represented by the voltage across said resistor and a set point signal represented by the voltage across said capacitor; and
    means connecting said output signal to the input of said output amplifier.

4. The controller of claim 3 wherein
    a second storage capacitor of smaller magnitude than said first capacitor is connected across said series combination.

5. The controller of claim 3 wherein
    a decoupling network is connected between said output amplifier and said demodulator.

6. The controller of claim 3 wherein
    said demodulator includes two transistor switches, said output amplifier includes a transistor, and having a transistor decoupling network connected between said output amplifier and said demodulator.

7. The controller of claim 3 wherein
    the magnitude of said capacitor and the breakdown voltage of said double-ended diode are selected such that the voltage equivalent of the temperature slewing error equals the breakdown voltage of the diode.

8. The controller of claim 3 wherein
a second storage capacitor of smaller magnitude than said first capacitor is connected across said series combination; and
said demodulator includes two transistor switches, said output amplifier includes a transistor, and having a transistor decoupling network connected between said output amplifier and said demodulator.

9. The controller of claim 3 wherein
a second storage capacitor of smaller magnitude than said first capacitor is connected across said series combination;
said demodulator includes two transistor switches, said output amplifier includes a transistor, and having a transistor decoupling network connected between said output amplifier and said demodulator; and
the magnitude of said first capacitor and the breakdown voltage of said double-ended diode are selected such that the voltage equivalent of the temperature slewing error equals the breakdown voltage of the diode.

10. The controller of claim 3 in which
said first storage capacitor has an associated resistive network for modifying its frequency response to match the frequency response of the load in order to provide a stable closed loop response.

11. An oven temperature controller stabilizing network comprising:
an oven containing a resistance thermometer;
means connecting said resistance thermometer in a bridge circuit capable of adjustment to have zero output at a set temperature point;
a stabilizing network including a storage device in series combination with a parallel combination of a resistor and a voltage breakdown device;
means connecting the output of said thermometer across said series combination to derive an output signal comprising a combination in a selectable ratio of an error signal represented by the voltage across said resistor and a set point signal represented by the voltage across said storage device;
a phase controlled modulation network having an oven heater resistor in its load circuit; and
means for applying said output signal to control the current in the load of said phase controlled network.

12. An oven temperature controller stabilizing network comprising:
an oven containing a resistance thermometer;
a bridge circuit including said resistance thermometer capable of adjustment to have zero output at a set temperature point;
an A.C. amplifier;
a modulator circuit comprising, a transistorized demodulator having two transistor switches, a stabilizing network including a first storage capacitor in series combination with a parallel combination of a resistor and a double-ended zener diode, a second storage capacitor of smaller capacity than said first capacitor connected across said series combination, a transistor output amplifier having an emitter and an input connected from a point on said resistor, a decoupling transistor network connected from said emitter to one of said transistor switches in said demodulator and to a point of reference potential, a resistor connected from said emitter to said point of reference potential, means connecting the output of the other of said transistor switches in said demodulator to a terminal, means connecting the point between said second storage capacitor and said double-ended zener diode to said terminal, means connecting the common connection between said storage capacitors to said point of reference potential, means connecting a clipping diode between said terminal and said point of reference potential, and means connecting a second clipping diode between said terminal and a second point of lower reference potential;
means connecting said A.C. amplifier with the output of said bridge as its input, and with its output to the input of said modulator;
a unijunction transistor oscillator having a timing capacitor connected across its input circuit;
means connecting the output of said output amplifier to said timing capacitor;
a full wave silicon controlled rectifier switching circuit having an oven heater resistor connected in its load circuit in series with a source of A.C. voltage across said circuit;
means coupling the output of said unijunction oscillator to the inputs of said full wave silicon controlled rectifier circuit; and
means for supplying unfiltered rectified alternating voltage across the unijunction bases synchronized with the voltage applied across said full wave controlled rectifier circuit such that the voltage across the unijunction bases is zero at the same time that the voltage across the controlled rectifiers is zero.

References Cited
UNITED STATES PATENTS 3,159,737 12/1964 Dora _____ 219—501
3,239,748 3/1966 Berglund _____ 323—23

RICHARD M. WOOD, Primary Examiner.

C. L. ALBRITTON, Assistant Examiner.